UNITED STATES PATENT OFFICE.

THOMAS CRUSE, OF HELENA, MONTANA.

METHOD OF EXTRACTING GOLD AND SILVER FROM THEIR ORES.

SPECIFICATION forming part of Letters Patent No. 646,808, dated April 3, 1900.

Application filed October 17, 1898. Serial No. 693,765. (No specimens.)

*To all whom it may concern:*

Be it known that I, THOMAS CRUSE, a citizen of the United States, and a resident of Helena, county of Lewis and Clarke, and State of Montana, have invented certain new and useful Improvements in Processes of Extracting Gold and Silver from Their Ores, of which the following is a specification.

The object of the invention is to more perfectly extract and save such metals and in a more economical manner, as more fully hereinafter set forth.

My process consists, essentially, of the following steps:

First. Reduce the ore or quartz or other gold and silver bearing material in the ordinary way to a pulp which will pass through at least a fifty-mesh screen. In practice I reduce the ore in the well-known batteries, which consist of devices for crushing the ore and extracting the free gold by running the wet pulp over copper amalgamating-plates. The manganese iron and other base metals contained in the pulp that comes from the batteries flours a portion of the mercury in the batteries and carries it along with the pulp, as is well known, this floured mercury containing minute particles of gold and silver.

Second. After settling and passing the pulp and slime into a suitable vessel—for instance, an ordinary silver amalgamating-pan—put in cyanid of potassium in the proportions hereinafter stated and then heat the contents of the pan to a boiling-point by means of steam injected directly into the mass, the steam to be turned off and the mass allowed to cool gradually after the boiling-point is reached. This heating may of course be done in any other suitable way, and it is also obvious that it may be done either after the cyanid is put in or before, as desired.

Third. In from three to five hours after the application of the cyanid (the gold and silver being then practically all in solution) while the mass is still hot add blue-stone in the proportions hereinafter mentioned. After the addition of blue-stone there is a precipitation of aurous cyanid, silver cyanid, and copper cyanid. This precipitation takes out of the solution practically all the soluble gold and silver.

Fourth. In from one to two hours after the application of the blue-stone and while the mass is still hot add sulfate of iron or sulfuret of iron or other similar reagent. The application of either of these reagents precipitates in the form of metallic gold any gold which may remain in solution after the aurous cyanid is precipitated by the copper sulfate. When sulfuret of iron is used, it also precipitates as sulfid of silver any silver that may remain in solution. I believe also that the iron-sulfur reagents release the floured and sickened mercury that comes over the battery-plates and enables me to subsequently recover it, and thereby effect a material saving. Thus recovering the flours of mercury of course also insures the recovery of the fine particles of gold and silver held therein.

Fifth. In one hour after the application of iron sulfate or other reagent, the mass being still hot, add sulfuric acid and immediately thereafter add quicksilver. By the application of the sulfuric acid to the hot mixture the precipitated aurous cyanid, silver cyanid, and silver sulfid are decomposed and the gold and silver set free and placed in condition to be immediately taken up by the quicksilver as an alamgam.

Such particles of gold as are so coated with rust or otherwise protected that they will not be caught by the amalgamator and are too coarse to be dissolved by the cyanid in the short time they remain in the cyanid solution will be cleaned by the acids and be then in condition to be readily amalgamated when the quicksilver is added later on.

The relative proportions of the materials to be used in any given operation are about as follows: one pound of cyanid of potassium, one pound of blue-stone, one pound of sulfate or sulfuret of iron, one pound of sulfuric acid, and ten pounds of quicksilver, and in a given ton of ore or other material, containing not to exceed one-fourth of an ounce of gold or five ounces of silver or less, quantities should be as follows: from one to three pounds of cyanid of potassium, one and one-half pounds of blue-stone, from one to five pounds of sulfate or sulfuret of iron, from one to five pounds of sulfuric acid, and fifteen pounds of quicksilver, the quantity of each ingredient to be increased in proportion to the increase of the gold and silver in the ore or other material, and if the gold and silver contents of the ore are of less quantity than above indicated the materials may be proportionally decreased.

By my process the use of zinc and other substances as necessary adjuncts to the well-known cyanid process are avoided, while the recovery of the gold and silver is more prompt and perfect. Actual tests have shown that the blue-stone and sulfate or sulfuret of iron used in the order and substantially the proportions named will practically precipitate all the gold and silver in the forms described and that the sulfuric acid applied in the proportion and after the time limit named will in turn free them, whereupon the quicksilver and liberated metals form amalgams. The ordinary retort may then be used to expel the quicksilver, leaving only the gold and silver.

In practice I find that the application of heat stimulates and perfects the action of the cyanid, blue-stone, and sulfate or sulfuret of iron, the recovery of the precious metals being more prompt and complete than is possible with the zinc now generally used for that purpose in connection with the well-known cyanid process. I find also that the inherent heat in the mass after the steam is turned off keeps it sufficiently hot to bring about the results desired from the subsequent steps of the process.

The effect and action of the chemicals used in the process are stated as accurately and definitely as I have been able to determine at this time.

Having thus fully described my invention, what I claim, and desire to secure by Letters Patent, is—

1. The improved process of recovering precious metals from their ores, which consists in reducing the ore to a pulp, adding cyanid of potassium and heating the mass, adding blue-stone while the mass is still hot, then decomposing the precipitated compounds and recovering the precious metals.

2. The improved process of recovering precious metals from their ores, which consists in reducing the ore to a pulp, adding cyanid of potassium, adding blue-stone to the mass, then decomposing the precipitated compounds to free the precious metals, then adding quicksilver.

3. The improved process of recovering precious metals from their ores, which consists in reducing the ore to a pulp, adding cyanid of potassium, adding to the mass a suitable compound to precipitate the gold and silver cyanids, adding a reagent, to precipitate the precious metals which may remain in the solution after the precipitation of the aurous and silver cyanids, then decomposing the precipitated substances to free the precious metals, then adding quicksilver to form amalgams.

4. The improved process of recovering precious metals from their ores, which consists in first reducing the ore to a pulp, heating the pulp, adding cyanid of potassium, adding to the mass sulfate of copper to precipitate the aurous and silver cyanids, then a reagent to precipitate the precious metals which may remain in solution after the cyanid is precipitated, then adding sulfuric acid to the hot mass to decompose the precipitated matter and quicksilver to form an amalgam.

5. The improved process of recovering precious metals from their ores, which consists in first reducing the ore to a pulp, adding cyanid of potassium, adding to the mass blue-stone to precipitate the aurous and silver cyanids, then adding a reagent to precipitate the precious metals which may remain in solution after the precipitation of the aurous and silver cyanids, then decomposing the precipitated cyanids to free the precious metals, then extracting the precipitated metals.

6. The improved process of recovering precious metals from their ores, which consists in first heating the ore-pulp to the boiling-point, adding cyanid of potassium to the hot mass and then permitting the mass to gradually cool and while it is cooling adding to the mass the following: blue-stone, iron sulfate, sulfuric acid, and quicksilver, substantially as described.

In testimony whereof I hereunto affix my signature, in the presence of two witnesses, this 6th day of October, 1898.

THOMAS CRUSE.

Witnesses:
W. J. DEVERING,
F. J. LANGE.